United States Patent
Nelson

(10) Patent No.: US 7,137,182 B2
(45) Date of Patent: Nov. 21, 2006

(54) PARALLEL CONFIGURATION COMPOSITE MATERIAL FABRICATOR

(75) Inventor: Paul E. Nelson, University Place, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/301,949

(22) Filed: Nov. 22, 2002

(65) Prior Publication Data

US 2004/0098852 A1 May 27, 2004

(51) Int. Cl.
*B21D 39/03* (2006.01)

(52) U.S. Cl. .......................... 29/428; 29/458; 29/819; 156/253; 156/269; 156/302; 156/433; 156/574; 156/361; 425/375

(58) Field of Classification Search ................ 156/361, 156/433, 441, 523, 574, 169, 175, 486, 577; 425/163, 375; 428/411.1; 29/809, 819
See application file for complete search history.

(56) References Cited

U.S. PATENT DOCUMENTS

| | | | |
|---|---|---|---|
| 3,574,040 A * | 4/1971 | Chitwood et al. ........... 156/522 |
| 3,587,378 A * | 6/1971 | Oppenheim et al. .......... 83/801 |
| 3,879,245 A | 4/1975 | Fetherson et al. |
| 4,064,534 A | 12/1977 | Chen et al. |
| 4,208,238 A * | 6/1980 | August et al. ............... 156/510 |
| 4,285,752 A * | 8/1981 | Higgins ....................... 156/250 |
| 4,292,108 A * | 9/1981 | Weiss et al. ................. 156/259 |
| 4,310,132 A | 1/1982 | Frosch et al. |
| 4,461,669 A * | 7/1984 | Dontscheff ................... 156/574 |
| 4,491,493 A | 1/1985 | Eaton |
| 4,508,584 A | 4/1985 | Charles |
| 4,531,992 A | 7/1985 | Eaton |
| 4,548,859 A | 10/1985 | Kline et al. |
| 4,591,402 A * | 5/1986 | Evans et al. ................. 156/350 |
| 4,608,220 A | 8/1986 | Caldwell et al. |
| 4,693,678 A | 9/1987 | Von Volkli |
| 4,699,683 A * | 10/1987 | McCowin ..................... 156/353 |
| 4,760,444 A | 7/1988 | Nielson et al. |
| 4,780,262 A | 10/1988 | Von Volkli |
| 4,790,898 A | 12/1988 | Woods |
| 4,830,298 A | 5/1989 | Van Blunk |
| 4,867,834 A | 9/1989 | Alenskis et al. |
| 4,877,471 A | 10/1989 | McCowin et al. |
| 4,941,182 A | 7/1990 | Patel |

(Continued)

FOREIGN PATENT DOCUMENTS

DE      30 40 838      5/1982

(Continued)

OTHER PUBLICATIONS

U.S. Appl. No. 10/630,594 entitled Composite Fuselage Machine, filed Jul. 28, 2003, Braun.

(Continued)

*Primary Examiner*—David P. Bryant
(74) *Attorney, Agent, or Firm*—Harness Dickey & Pierce P.L.C.

(57) ABSTRACT

A device for fabricating a composite article having a plurality of material dispensers to increase productivity. The device includes a structure defining a work surface datum, the plurality of material dispensers which are movable relative to the structure, where each of the material dispensers applies a strip material to the work surface datum along a predetermined axis, and wherein each of said predetermined axes are parallel to one another and where the strip material as applied to the work surface datum forms a layer. A method for fabricating a composite in accordance with the present invention is also provided.

45 Claims, 8 Drawing Sheets

U.S. PATENT DOCUMENTS

| | | | |
|---|---|---|---|
| 5,022,952 A * | 6/1991 | Vaniglia | 156/441 |
| 5,024,399 A | 6/1991 | Barquet et al. | |
| 5,058,497 A | 10/1991 | Bishop et al. | |
| 5,337,647 A | 8/1994 | Roberts et al. | |
| 5,439,549 A | 8/1995 | Fryc et al. | |
| 5,450,147 A | 9/1995 | Dorsey-Palmateer | |
| 5,518,208 A | 5/1996 | Roseburg | |
| 5,540,126 A | 7/1996 | Piramoon | |
| 5,645,677 A * | 7/1997 | Cahuzac et al. | 156/361 |
| 5,651,600 A | 7/1997 | Dorsey-Palmateer | |
| 5,683,646 A | 11/1997 | Reilling, Jr. | |
| 5,700,337 A | 12/1997 | Jacobs et al. | |
| 5,746,553 A | 5/1998 | Engwall | |
| 5,804,276 A | 9/1998 | Jacobs et al. | |
| 5,814,386 A | 9/1998 | Vasiliev et al. | |
| 5,871,117 A | 2/1999 | Protasov et al. | |
| 5,954,917 A | 9/1999 | Jackson et al. | |
| 5,963,660 A | 10/1999 | Koontz et al. | |
| 5,979,531 A | 11/1999 | Barr et al. | |
| 6,012,883 A | 1/2000 | Engwall et al. | |
| 6,013,341 A | 1/2000 | Medvedev et al. | |
| 6,045,651 A | 4/2000 | Kline et al. | |
| 6,074,716 A | 6/2000 | Tsotsis | |
| 6,086,696 A | 7/2000 | Gallagher | |
| 6,112,792 A | 9/2000 | Barr et al. | |
| 6,168,358 B1 | 1/2001 | Engwall et al. | |
| 6,205,239 B1 | 3/2001 | Lin et al. | |
| 6,364,250 B1 | 4/2002 | Brinck et al. | |
| 6,390,169 B1 | 5/2002 | Johnson | |
| 6,451,152 B1 | 9/2002 | Holmes et al. | |
| 6,480,271 B1 | 11/2002 | Cloud et al. | |
| 6,648,273 B1 | 11/2003 | Anast | |
| 6,692,681 B1 | 2/2004 | Lunde | |
| 6,799,619 B1 | 10/2004 | Holmes et al. | |
| 2001/0023349 A1 | 9/2001 | Van Tassel et al. | |
| 2002/0141632 A1 | 10/2002 | Engelbart et al. | |

FOREIGN PATENT DOCUMENTS

| | | | |
|---|---|---|---|
| DE | 30 40 838 A | 5/1982 | |
| DE | 33 31 494 | 3/1985 | |
| DE | 33 31 494 A | 3/1985 | |

OTHER PUBLICATIONS

U.S. Appl. No. 10/646,316 entitled Unidirectional, Multi-Head Fiber Placement, filed Aug. 22, 2003, New.

U.S. Appl. No. 10/646,392 entitled Automated Composite Lay-Up to an Internal Fuselage Mandrel, filed Aug. 22, 2003, Engwall.

U.S. Appl. No. 10/646,509 entitled Multiple Head Automated Composite Laminating Machine for the Fabrication of Large Barrel Section Components, filed Aug. 22, 2003, Johnson.

U.S. Appl. No. 10/717,030 entitled Method of Transferring Large Uncured Composite Laminates, filed Nov. 18, 2003, Johnson.

U.S. Appl. No. 10/799,306 entitled Systems and Methods Enabling Automated Return to and/or Repair of Defects With a Material Placement Machine, filed Mar. 12, 2004, Engelbert et al.

http://www.cinmach.com/WolfTracks4_1/MTG_WT7.htm; Premier I Features Lighter, Stronger All-Composite Fuselage, 3 pages.

http://www.cinmach.com/compnews/PressReleases/pr00-11.htm; Raytheon Aircraft Orders Four More Fiber Cincinnati Fiber Placement Systems for Industry's First Composite-Fuselage Business Jets, 2 pages.

http://www.rockymountaincomposites.com/wind_sys.htm; Filament Winding, 2 pages.

Pending U.S. Appl. No. 10/068,735, filed Feb. 6, 2002, Engelbart et al.

Pending U.S. Appl. No. 10/217,805, filed Aug. 13, 2002, Engelbart et al.

Pending U.S. Appl. No. 10/628,691, filed Jul. 28, 2003, Engelbart et al.

Pending U.S. Appl. No. 10/664,148, filed Sep. 17, 2003, Engelbart et al.

Pending U.S. Appl. No. 10/726,099, filed Dec. 2, 2003, Engelbart et al.

Sharp et al.; "*Material Selection/Fabrication Issues for Thermoplastic Fiber Placement*", Journal of Thermoplastic Composite Materials, vol. 8; Jan., 1995, p. 2-14.

European Search Report, Application No. EP 03 07 8499, Dated Mar. 4, 2004, 5 pages.

U.S. Appl. No. 11/001,803, filed Dec. 2, 2004, Zaballos et al.

U.S. Appl. No. 11/005,667, filed Dec. 7, 2004, Lum.

U.S. Appl. No. 11/048,390, filed Feb. 1, 2005, Olson et al.

Pending provisional U.S. Appl. 60/559,890, filed Apr. 4, 2004, Johnson et al.

Pending provisional U.S. Appl. No. 60/559,890, filed Apr. 6, 2004, Biornstad et al.

Pending U.S. Appl. No. 10/819,084, Turnmire et al.

Pending U.S. Appl. No. 10/853,075, Johnson et al.

Pending utility U.S. Appl. No. 10/949,848, filed Sep. 23, 2004, Stulc.

Advanced Technology Tape Laying for Affordable Manufacturing of Large Composite Structures; http://www.cinmach.com/tech/pdf/TapeLayingGrimshaw.pdf; Michael N. Grimshaw, et al; 11 pages.

Fiber Placement; http://www.cinmach.com/tech/pdf/asm_chapter_fp.pdf; Don O. Evans; Cincinnati Machine; 3 pages.

Automated Tape Laying; http://www.cinmach.com/tech/pdf/Grimshaw%20ASM%20Handbook.pdf; Michael N. Grimshaw; Cincinnati Machine; 6 pages.

Raytheon Aircraft's Hawker Horizon Reaches Fuselage Milestone, Raytheon News Release; http:www.beechcraft.de/Presse/2000/100900b.htm; 2 pages.

U.S. Appl. No. 10/822,538 entitled Systems and Methods for Using Light to Indicate Defect Locations on a Composite Structure, filed Mar. 12, 2004, Engelbart et al.

Pending U.S. Appl. No. 10/846,974 entitled Systems and Methods for Identifying Foreign Objects and Debris (FOD) and Defects During Fabrication of a Composite Structure, filed May 14, 2004, Engelbart et al.

Pending U.S. Appl. No. 10/851,381 entitled Composite Barrel Sections for Aircraft Fuselages and Other Structures, and Methods and Systems for Manufacturing Such Barrel Sections, filed May 20, 2004, Biornstad.

Fiedler, L., et al, "Tango Composite Fuselage Platform", SAMPE Journal, vol. 39, No. 1, Jan./Feb. 2003, pp. 57-63.

BAe 146, Flight International, May 2, 1981, 2 pages.

A Barrelful of Experience, Intervia, May 1992, 2 pages.

Raytheon, Mar. 2000, vol. 4, No. 2, http://www.cts.com/king/vasci/newsletter/vol42.html.

Business Aviation, Jun. 7, 2002, http://www.aviationnow.com/avnow/news/channel_busav.jsp?view=story&id=news/btoyo0607.xml.

Beechraft's Composit Challenge, http://www.aerotalk.com/Beech.cfm.

Evans, Don O., "Fiber Placement", 3 pages, Cincinnati Machine, pp. 477-479.

CPC-610, Automatic Composite Tape Laying System, 1 page.

\* cited by examiner

US 7,137,182 B2

PARALLEL CONFIGURATION COMPOSITE MATERIAL FABRICATOR

FIELD OF THE INVENTION

The present invention generally relates to devices and methods for the fabrication of articles from composite materials.

BACKGROUND OF THE INVENTION

Articles that are formed partially or wholly from composite materials (herein after referred to as "composite articles") are employed in a vast number of fields, usually to provide the finished article with desired characteristics, such as a relatively low weight and a relatively high strength. One method of fabricating composite articles includes the use of strips of a composite material, such as a graphite tape or cloth, to form what is known in the art as a composite "lay-up". The lay-up includes one or more layers, with each layer being formed from touching and/or overlapping strips of the material. A resin, which may be pre-impregnated in the material or later injected into one or more of the layers of material, is later processed to cure the lay-up such that the material strips are bonded together. Typically, the lay-up is formed on a mandrel having a formed work surface that conforms to the desired geometry of the finished composite article. Since the lay-up is relatively flexible and unable to support itself prior to curing, the mandrel is usually employed to support the lay-up during the curing process.

Known methods for the fabrication of composite articles include manual and automated fabrication. Manual fabrication entails manual cutting and placement of material by a technician to a surface of the mandrel. This method of fabrication is time consuming and cost intensive, and could possibly result in non-uniformity in the lay-up. Known automated fabrication techniques include: flat tape laminating machines (FTLM) and contour tape laminating machines (CTLM). Typically, both the FTLM and the CTLM employ a solitary composite material dispenser that travels over the work surface onto which the composite material is to be applied. The composite material is typically laid down a single row (of composite material) at a time to create a layer of a desired width and length. Additional layers may thereafter be built up onto a prior layer to provide the lay-up with a desired thickness. FTLM's typically apply composite material to a flat transfer sheet; the transfer sheet and lay-up are subsequently removed from the FTLM and placed onto a mold or on a mandrel. In contrast, CTLM's typically apply composite material directly to the work surface of a mandrel.

The specifications for many composite articles further require that the composite material of each layer be applied in a predetermined orientation, with the orientations of each layer being different. To vary the orientation of the composite material in the layers, typically either the tape dispenser is moved at different angles relative to the mandrel or transfer sheet, or the mandrel or transfer sheet is manually shifted relative to the tape dispenser. The batch processing employed in known automated tape laminating devices can be slow, tedious, and cumbersome. Therefore, there is a need for an automated process that expedites the fabrication of and increases the quality of composite lay-ups.

SUMMARY OF THE INVENTION

The present invention provides a device for fabricating a composite article. The device includes a structure defining a work surface datum, a plurality of material dispensers that are movable relative to the structure, where each of the material dispensers applies a strip material to the work surface datum along a predetermined axis. The predetermined axes are parallel to one another and when the strip material is applied to the work surface datum it forms a layer of the composite article.

The present invention further provides a method of fabricating a composite article comprising the steps of: providing a plurality of material dispensers, applying strip material with the plurality of material dispensers to a work surface datum along a predetermined axis to form a first layer having a first orientation, wherein the work surface datum is movable relative to the plurality of material dispensers, rotating one of either the work surface datum or the plurality of material dispensers, and applying the strip material over the first layer along a predetermined axis to form a second layer having a second orientation.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
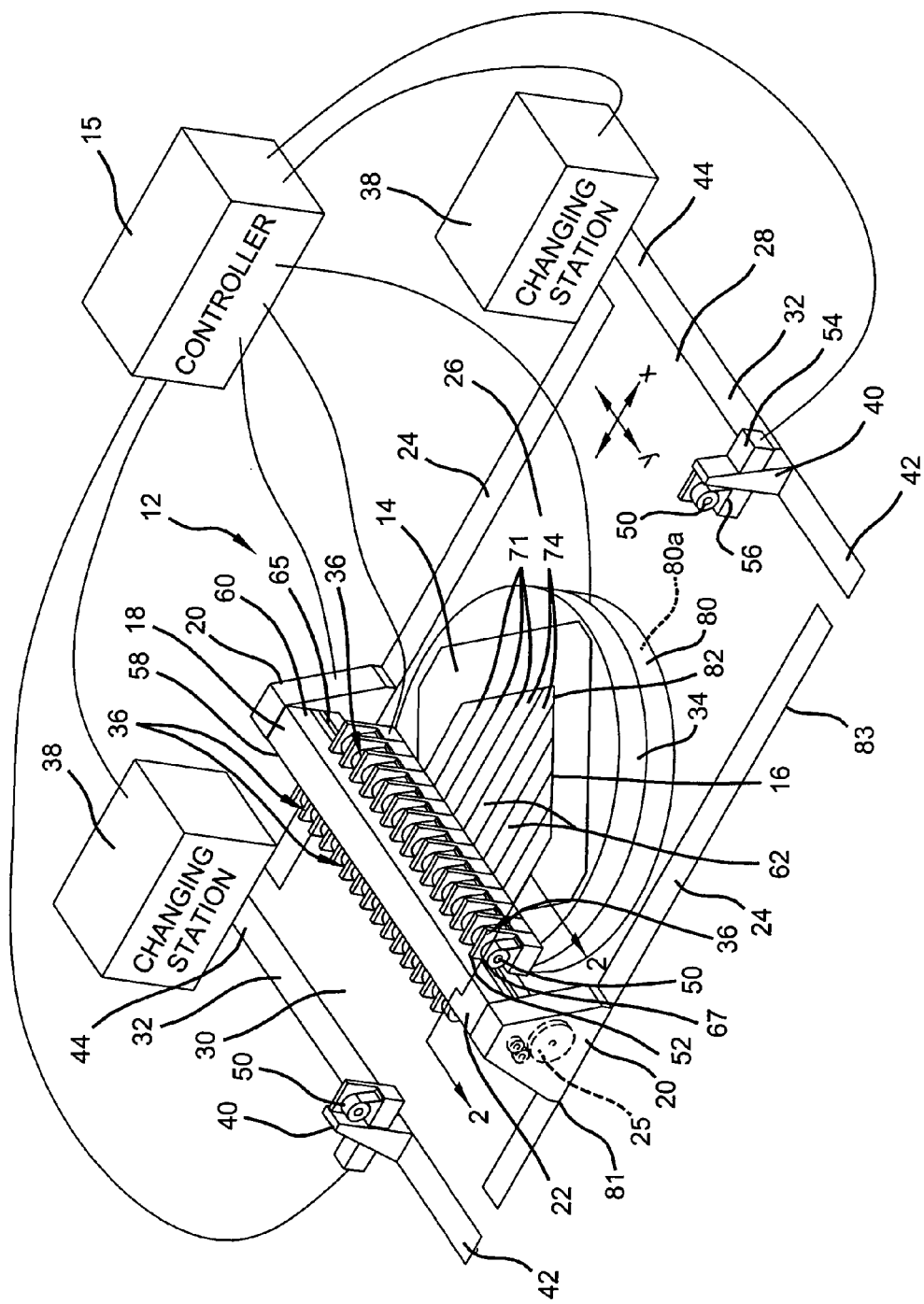
FIG. 1 is a perspective view of a composite fabrication device constructed in accordance with a preferred embodiment of the present invention.

With reference to FIG. 1, a composite fabrication device constructed in accordance with the teachings of the present invention is generally indicated by the reference numeral 12. In the particular embodiment illustrated, the composite fabrication device 12 includes a structure 14 having a work surface datum (i.e., a work surface) 16. The composite fabrication device 12 has a gantry 18 elevated over the work surface datum 16. In the example provided, the gantry 18 includes two vertical beams 20 and a bridge rail 22. Those skilled in the art will appreciate, however, that the gantry 18 may be constructed in numerous other ways including a pair of overhead runways or beams (not shown) that support the opposite ends of the bridge rail 22.

The vertical beams 20 are associated with a pair of tracks 24 that bound the opposite sides of a working area 26. For purposes of discussion, the tracks 24 define a X-axis that is generally perpendicular to a Y-axis defined by the bridge rail 22. The vertical beams 20 preferably move along the tracks 24, thus the tracks 24 may be, for example, rails over which wheels (not shown) attached to the vertical beams 20 travel. Preferably, the gantry 18 is selectively propelled along the tracks 24 by a suitable drive mechanism 25, which may be a servo tractor or any drive mechanism known in the art. The bridge rail 22 is attached to the vertical beams 20, either in a fixed position or such that it has vertical mobility with respect to the structure 14 below. In the latter instance, the bridge rail 22 is permitted to move vertically to adjust the position of the bridge rail 22 relative to the structure 14 that is located beneath the gantry 18. Translation of the gantry 18 on the tracks 24 and, if the gantry 18 is equipped as such, vertical movement of the bridge rail 22 may be automatically or manually controlled. The composite fabrication device 12 includes a control processing unit, or a controller 15, that interfaces with the drive mechanism 25 and the gantry 18 and its several components. In view of the extent of the disclosure, a detailed discussion of the construction and operation of the controller 15 need not be provided herein as such controllers 15 are well within the capabilities of one skilled in the art.

An anterior end 28 and a posterior end 30 of the working area 26 are bounded by end tracks 32. Within the working area 26, the structure 14 may be placed upon or incorporated into a support base 34. In a preferred aspect of the present embodiment of the invention, the support base 34 is rotatable relative to the bridge rail 22. Such rotation is preferably achieved by placing the support base 34 on a rotary turntable 80 or incorporating a conventional rotary drive mechanism 80*a* into the support base 34. Thus, the work surface datum 16 of the structure 14 may have its orientation changed by rotating the rotary turntable 80 in the example provided. Alternatively, the support base 34 may have a fixed position and the gantry 18 may be moved (e.g., rotated) or the movement of the bridge rail 22 rotated and controlled along both the X and Y axes to change the orientation with which material is laid onto the work surface datum 16 as will be discussed in greater detail, below.

Figure 2:
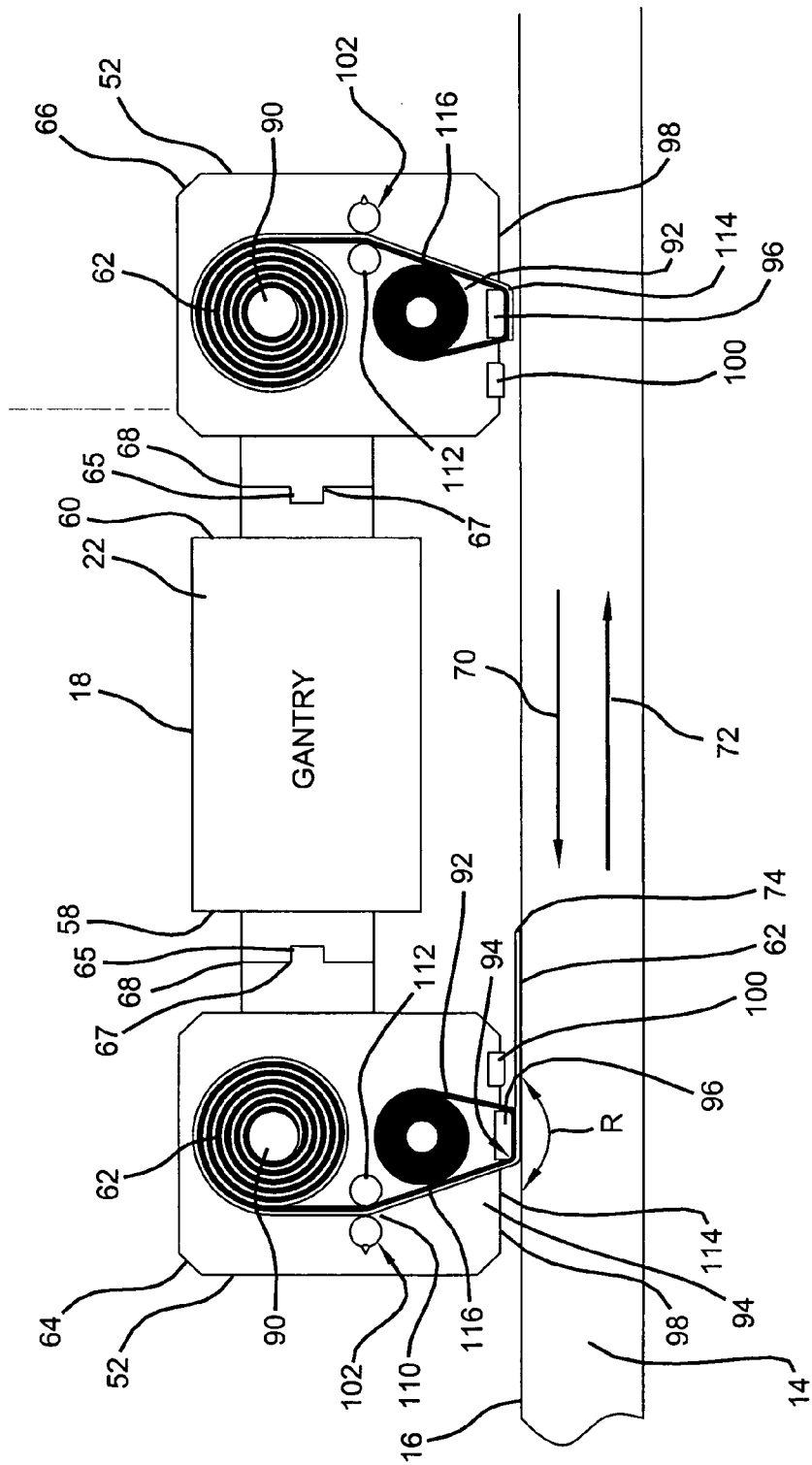
FIG. 2 is a cross-sectional view taken along the line 2—2 of FIG. 1.

A plurality of material dispensers 36 are attached to opposite sides 58 and 60, respectively, of the bridge rail 22. The material dispensers 36 may also be attached to only a single side (58 or 60) of the bridge rail 22, if adjacent material dispensers 36 are oriented to dispense material in opposite directions. The material dispensers 36 apply material strips 62, such as for example, carbon fiber pre-impregnated resin tapes or cloth, to the work surface datum 16 of the structure 14. The position of material dispensers 36 along the bridge rail 22 is fixed such that the material dispensers 36 are attached at predetermined positions along the bridge rail 22. In an alternate embodiment, the position of the material dispensers 36 may be adjustable and the position of the material dispensers 36 may be translated relative to one another along the bridge rail 22 to accommodate a variety of differently sized strip materials 62 and material dispenser 36 configurations, as shown in FIGS. 1 and 2. The material dispensers 36 may be translated along the bridge rail 22 by any known method in the art. One preferred method is to attach the material dispensers 36 to a track 65 along the bridge rail 22. Locking mechanisms 67 on the material dispensers 36 lock the position of each material dispenser 36 during operation. Release of the locking mechanisms 67 allows movement of the material dispensers 36 to new positions along the bridge rail 22. The bridge rail 22 and track 65 may also permit introduction or removal of material dispensers 36, as necessary.

A preferred configuration for the present embodiment includes staggered material dispensers 36 on the sides 58, 60 of the bridge rail 22, as shown in the example of FIG. 1. Each material dispenser 36 has a housing 52 containing rolled strip material 62. Since the housing 52 typically is wider than the width of the strip material 62, the staggered configuration allows applied strip materials 62 to abut or only have small gaps (preferably less than one-half the width of strip material 62) in between. Thus, a material dispenser 36 on the first side 58 of the gantry 18 is situated with respect to a material dispenser 36 on the second side 60 so as to allow the strip material 62 to be applied in an alternating strip pattern. The amount of distance between edges 71 of strip material 62 is a function of the distance between the material dispensers 36 and is chosen based upon various design criteria for the composite lay-up that is to be fabricated. The position of strip material 62 edges 71 relative to one another may range from a small gap (which is preferred) to no overlap (i.e., abutting) to over one-half the width of the strip material 62. The distance between the material dispenses 36 may require adjustment (via the track 65 and locking mechanisms 67, for example) to provide the desired degree of overlap. In an alternate embodiment, the material dispensers 36 may be fixed along the bridge rail 22, and the bridge rail 22 moves a short distance along the Y axis (i.e. less than the width of the strip material 62), to enable similar strip material 62 layers to overlap previously applied layers of strip material 62 in the same orientation.

With reference to FIG. 2, material dispensers 36 are illustrated as coupled to the bridge rail 22. For purposes of discussion, a first one (64) of the material dispensers 36 is coupled to the first side 58 of the bridge rail 22, and a second one (66) of the material dispensers 36 is coupled to the second side 60. Each of the material dispensers 36 operably houses strip material 62 that is rolled onto a spool 90 in the material dispenser housing 52. Such strip material 62 on a spool 90 may optionally be held in a separate cartridge (not shown) contained within the housing 52. Strip material 62 has a backing paper 92 to prevent undesirable blocking of the strip material 62 during release. The strip material 62 is cut prior to approaching a release region 94 wherein the strip material 62 is applied to the work surface datum 16.

Figure 5:
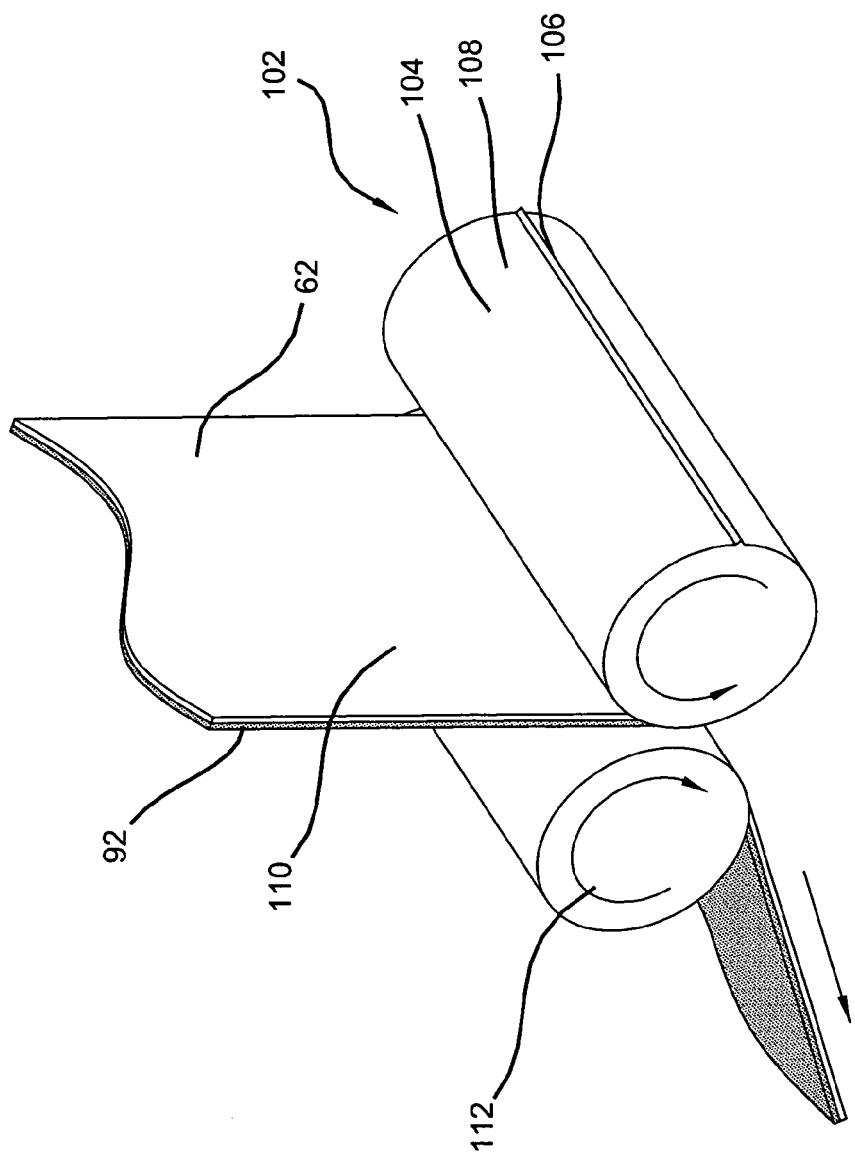
FIG. 5 is a perspective view of a portion of an exemplary material dispenser illustrating the cutter and idler drum.

The material dispenser 36 also has a cutter 102 for cutting the strip material 62. Such cutters 102 may be for example, blade or laser cutters. One preferred embodiment of a cutter 102 is shown in FIGS. 2 and 5, where a cutter drum 104 has a surface 108 with a single cutter blade 106 protruding and extending along the entire length of the cutter drum 104. As strip material 62 is applied to the work surface datum 16, the blade 106 faces away from the area 110 where strip material 62 passes. As the strip material 62 is unrolled, it passes over an idler drum 112 which directs it towards a release region 114. The strip material 62 passes between the idler drum 112 on one side and a cutter drum 104 on the other side. The cutter drum 104 sits stationary with the cutter blade 106 facing away from the strip material 62 passing by, unless a cut in the strip material 62 is necessary. Then, the cutter drum 104 is actuated and rolls towards the strip material 62 to cut it. This type of cutter drum 104 enables cutting to be accomplished continuously without interrupting strip material 62 application. The cutter drum 104 is configured such that only the strip material 62 is cut, leaving the backing paper 92 intact. The backing paper 92 continues to be wound onto a collector spool 116. The collector spool 116 may also be optionally contained in a cartridge (not shown) in the housing 52 with the roll 90 of strip material 62. The backing paper 92 draws the strip material 62 into the release region 114 of the material dispenser 36. The backing paper 92 facilitates movement and smooth application of the strip material 62 along the work surface datum 16.

An alternate embodiment of the cutter drum 104 of the present invention includes a helical configuration blade (not shown) that enables angled cuts to be made while the cutter drum 104 rotates towards the strip material 62. When the cutter blades 106 for each material dispenser 36 make straight cuts across the strip material 62, the resulting strip material composite lay-up has edges that are serrated or crenulated. Such a composite lay-up can later be trimmed, usually after curing occurs in the lay-up mandrel, to achieve a straight finished edge for the finished composite article.

The strip material 62 and backing paper 92 are compressed or smoothed against the work surface datum 16 by a primary compactor 96, or shoe, which is retractable (i.e. capable of descending from a bottom surface 98 of the material dispenser 36 and also capable of at least partially retracting above the bottom surface 98 of the material dispenser 36). Further, the primary compactor 96 optionally has a degree of freedom of rotational movement as designated by arrow R that enables the primary compactor 96 to adapt to angles or contours along the work surface datum 16. This freedom of movement may be necessary when the structure 14 is a contoured lay-up mandrel. The material dispenser 36 optionally has a trailing compactor 100, which may further assist in smoothing the strip material 62 along the work surface datum 16, especially at terminal edges 74 (FIG. 1) of the strip material 62 after it is cut. Both the primary and trailing compactors 96,100 retract when the material dispenser 36 is not in use and preferably the movement of the primary and trailing compactors 96,100 are automated by computerized controls.

Strip materials 62 may include fiber reinforced composites, polymers (e.g. adhesives or laminates), and metal foil, although the present invention is not limited to the materials listed above, but rather is adaptable to any strip material. As those skilled in the art will appreciate material selection for the strip material 62 is dependent on the application in which the composite article will be used and different strip materials 62 may be applied in alternate layers to provide the composite lay-up with desired characteristics.

Fiber reinforced composite materials are generally categorized as tape, woven cloth, non-woven cloth, paper, and mixtures thereof. "Tape" generally refers to uniaxial reinforcement fibers that extend along a single axis of the strip material. The term "cloth" generally refers to reinforcement fibers laid along at least two different axes within the strip material. Cloth is commercially available as bi-axial, tri-axial and quad-axial, indicating fibers extending in two, three, or four different axes, respectively. The fibers may optionally be woven with one another, or may be manufactured as non-woven cloth. A vast array of composite reinforcement fibers are commercially available, such as for example, carbon, Kevlar® fibers, glass, and mixtures thereof. Metal foils are also known in the art, and may be included in composite articles. Such metal foils are frequently interspersed as material layers within the lay-up composite. Strip materials are commercially available in a wide variety of widths. One common width for fiber reinforced material strips is 6 inches. The present invention contemplates and is adaptable to a variety of strip material widths, and material dispensers 36 may be re-positioned along the gantry 18 to accommodate different strip material widths.

The term "composite article" generally refers to a material that includes a composite resin matrix, wherein the resin includes at least one polymer or mixtures of polymers, and fibers or particles that are distributed throughout to form the matrix or composite. Strip material 62 is available in both resin pre-impregnated and non-impregnated configurations. A pre-impregnated resin strip material 62 (generally referred to as "pre-preg") has resin added into the strip prior to spooling it onto rolls. When a non-impregnated strip material 62 (generally referred to as "dry fiber") is employed, a resin is typically added in a subsequent processing step. Non-impregnated strip materials 62 typically employ a tackifier or adhesive (typically a polymer) that facilitates adhesion of the strip material 62 layers to the work surface datum 16 or other previously applied layers of strip material 62. Processing methods that subsequently add the resin into the layers of strip material 62 are well known in the art and include, for example, vacuum assisted resin infusion into the strip material 62.

Returning to FIG. 1, the material dispensers 36 must be changed out when the strip material 62 supply is exhausted or a different layer of strip material 62 is needed for the composite lay-up. In the particular embodiment provided material changers 40 service the material dispensers 36 to replace the entire material dispenser 36 itself. The material changers 40 may optionally change only material cartridges (not shown) contained within the housing 52 of the material dispensers 36. Thus, it is contemplated that the material changers 40 may optionally change out the entire material dispenser 36, including a housing 52, or may change out only a material cartridge leaving the housing 52 and material dispenser 36 attached to the bridge rail 22. The example shown in FIGS. 1 and 2, depicts material changers 40 that replace the entire material dispenser 36. However, either configuration of material changer 40 is feasible and contemplated in the present invention.

In a preferred embodiment, one or more mobile modular material changers 40 translate along each of the end tracks 32 to service the plurality of material dispensers 36 that are located on an associated side of the bridge rail 22. The end tracks 32 are adjacent to changing stations 38 which service the mobile material changers 40 and provide a repository for used and new material dispensers 36. The mobile modular material changers 40 hold a replacement material dispenser 36 for replenishing or changing the strip material 62 in the material dispensers 36 attached to the gantry 18.

Preferably the mobile modular material changer 40 is automated and interfaces with the gantry 18 to replace a designated material dispenser 36 when, for example, the material in a given material dispenser 36 has diminished to a predetermined level or a different strip material 62 is to be applied. The gantry 18 is moved to either the anterior or posterior end 28,30 so it is next to the end track 32. The material changer 40 moves laterally along the end track 32 so that it approaches the individual material dispenser 36 requiring service. Such a material dispenser 36 may be selected based on an output signal from the material dispenser 36 itself indicating that the amount of strip material 62 is low or may be automatically or manually selected to change the strip material 62 within the composite lay-up being formed. The material changer 40 has a receiving region 54 to place a spent or used material dispenser 36 into.

The material changer 40 also has a replacement region 56, storing the material dispenser 36 so that it is available for placing into the material dispenser 36.

The material changer 40 engages the material dispenser 36, interfaces with the gantry 18 as necessary to release the quick connect 68 which is either interconnected directly with the bridge rail 22 (not shown) or alternately with the track 65 and locking mechanism 67, and removes the material dispenser 36. The material changer 40 places the "old" material dispenser 36 into the receiving region 54, and acquires a "new" material dispenser 36 which it attaches to the bridge rail 22. Alternately, the material replenishing and/or changing operation may be accomplished manually. In such an embodiment, changing stations 38 and end tracks 32 would not be necessary components.

The material dispensers 36 are attached either directly to the chair rail 22, or attached to the track 65 on the chair rail 22, via a coupling 68. One preferred type of coupling 68 is a quick release connection generally known as a "quick connect", such as a Quick Change 300, which is commercially available from EOA Systems, Inc., located in Carrollton, Tex. Further, if only a cartridge (not shown) is removed from the material dispenser 36, it preferably is coupled to the housing 52 by a quick connect. As those skilled in the art will appreciate, however, suitable couplings and quick connects are well known in the art and as such, the scope of the present invention is not limited to the exemplary coupling discussed and illustrated herein. If the first and second material dispensers 64, 66 are attached to the track 65 that permits movement of the material dispensers 64, 66 along the bridge rail 22, the releasable locking mechanism 67 locks the material dispensers 36 in place.

As shown generally in FIGS. 1 & 2, each of the first and second material dispensers 64, 66 is employed to apply a strip material 62 to the work surface datum 16 of the structure 14. A pattern of multiple material strips 62 applied onto the work surface datum 16 by the plurality of material dispensers 36 on the first and second sides 58, 60 of the bridge rail 22 form a layer 82. An out stroke of the bridge rail 22 from the starting point 81 to the ending point 83 enables the material dispensers 36 to apply strip material 62 in a first direction 70, where each material strip 62 is substantially parallel with one another. The return or back stroke that occurs as the bridge rail 22 travels in a reverse direction from the ending point 83 back to the starting point 81 also enables strip material 62 to be laid in parallel along a predetermined axis by the second material dispensers, as shown by 72. A single round trip stroke of the gantry 18 creates an entire layer of material 82 composed of material strips 62 all parallel with one another.

The gantry 18 moves across the working area 26 over the structure 14 in a first direction 70 (i.e., an out stroke) and returns in a second direction 72 (i.e., a return stroke) laying strip material 62 along a predetermined axis. Although the gantry 18 may move over the entire working area 26 which spans from the anterior to posterior ends 28,30, the gantry 18 may alternatively only move over small regions of the working area 26. Thus, during operation when strip material 62 is being applied, the gantry 18 is capable of traveling a shortened distance along the tracks 24. This is advantageous where a structure 14 and its work surface datum 16 are relatively small in comparison to the overall work area 26 and the gantry 18 may only need to move partially along the tracks 24 from a starting position, or point, 81 at the front of the structure 14 to an ending position, or point, 83 at the end of the structure 14. Partial translation of the gantry 18 along the tracks 24 facilitates faster application of strip material 62 along a predetermined axis to the work surface datum 16.

Figure 3:
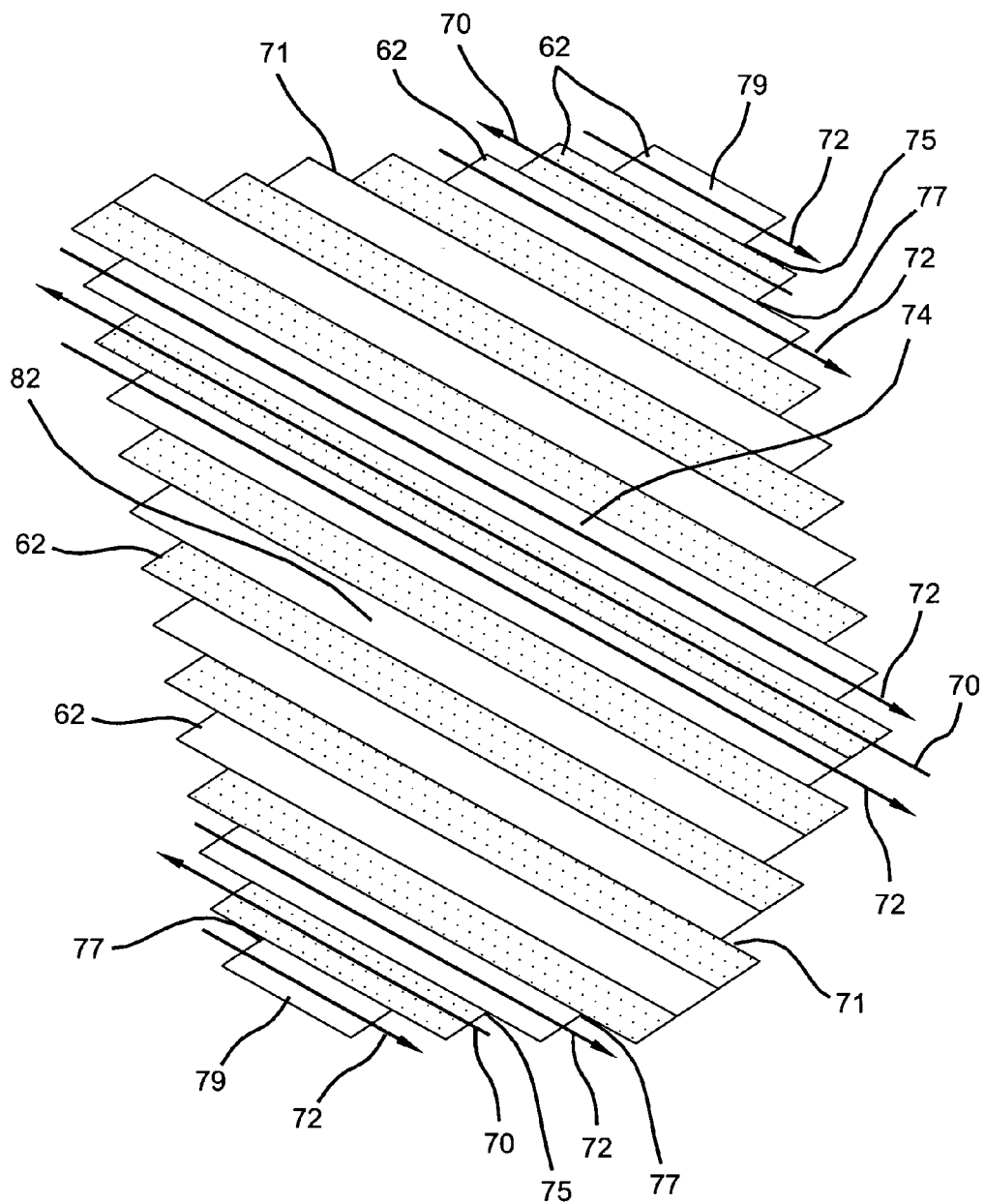
FIG. 3 is a plan view of a layer of strip material applied to a work surface datum in accordance with one preferred embodiment of the present invention.

With reference to FIG. 3, in the particular configuration illustrated, strip material 62 is applied in a first direction 70 (via the first material dispensers 64 in FIG. 1) and a second direction 72 (via the second material dispensers 66 in FIG. 2), wherein the second direction 72 is opposite the first direction 70. Each edge 71 of strip material 62 interfaces with (i.e. comes into close proximity with by either having a small gap or abutting) another edge 71 of another strip material 62 that was applied in the opposite direction. The junction lines 75,77 indicate where the edges of strip material 62 applied in a first direction 70 approach and/or abut the edges of the strip material 62 applied in a second direction 72.

Figure 4A:
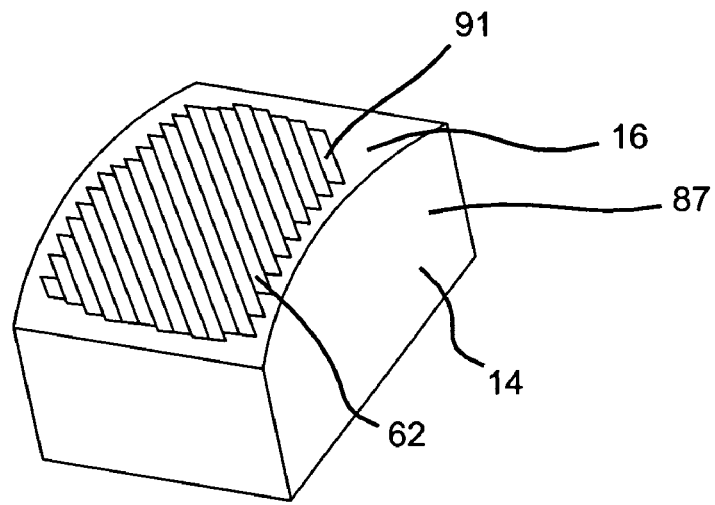
FIG. 4A is a schematic illustration showing the fabrication of an exemplary composite lay-up on a mandrel.
Figure 4B:
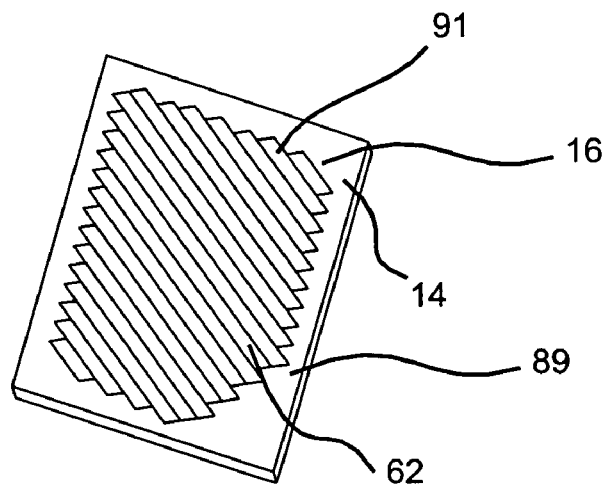
FIG. 4B is a schematic illustration showing the fabrication of an exemplary composite lay-up on a transfer sheet.

With reference to FIGS. 4A and 4B various alternatively constructed structures 14 are illustrated. The structure 14 shown in FIG. 4A is a lay-up mandrel 87. The lay-up mandrel 87 may be a template or mold that defines the work surface datum 16 onto which the strip material 62 is laid. Preferable, the work datum surface 16 of the lay-up mandrel 87 has only slight to moderate contours, such that the primary compactor 96 and trailing compactor 100 can pivot at slight to moderate angles to follow the contour in a manner such that the strip material is smoothed against the work surface datum 16. Typically a maximum grade or angle the compactors 96,100 can accommodate is about a 15% incline. After the strip material 62 application is complete (i.e., all of the layers have been laid onto the work surface datum 16 to thereby form a composite material lay-up 91), the lay-up mandrel 87 is removed from the working area 26 (FIG. 1) and further processed. For example, further processing may include adding polymer resin to the composite material lay-up 91 through vacuum injection processing and/or curing or cross-linking the strip material 62 that makes up the composite material lay-up 91 through autoclaving or baking. After processing, the composite article (not shown) is removed from the lay-up mandrel 87, where it may be trimmed and/or machined as necessary.

The structure 14 shown in FIG. 4B is a transfer sheet 89, which is a layer of material that provides a surface on which to apply strip material 62. As with a lay-up mandrel 87 shown in FIG. 4A, the strip material 62 is applied in multiple layers to form a lay-up 91 on the transfer sheet 89. After application of the strip material lay-up 91 is completed, the transfer sheet 89 is transferred to a separate lay-up mandrel (not shown) having the desired contour for the composite article and the strip material lay-up 91 is cured. The transfer sheet 89 may be designed to be removed from the lay-up 91, such as, for example, a removable paper backing as is known in the art. The transfer sheet 89 may alternatively be incorporated into the composite article or a part, forming, for example, an exterior or interior surface of the composite article. Incorporated transfer sheets 89 may be, for example, scrim cloth or fiberglass cloth, which may have later advantages if the composite part is machined. For example, the incorporated transfer sheet 89 may protect against splintering of the cured composite article when it is subjected to drilling or machining, and further may provide a smoother exterior finish. Subsequent processing of the lay-up 91, with or without the transfer sheet 89 is similar to the processing of the lay-up 91 when the mandrel 87 in FIG. 4A is used as the structure 14.

With renewed reference to FIG. 1, one aspect of a preferred embodiment of the present invention includes the support base 34, preferably mounted on the rotary turntable 80, wherein the orientation of the strip material 62 forming a layer 82 as applied to the work surface datum 16 can be selectively changed between layers 82 of the strip material 62. Composite reinforced materials having a single reinforced fiber direction (e.g. uniaxial tape) exhibit anisotropic characteristics, meaning that they typically exhibit relatively high strength along the primary axis of the reinforcement fibers, but do not exhibit the same strength along other axes. Thus, depending on the selection of strip materials and the application in which the composite reinforced material is used, it may be necessary for the composite material to exhibit isotropic or uniform strength in multiple directions for several predetermined axes. As discussed previously, when multiple material layers are laid upon the work surface datum 16 they are generally referred to as "lay-up". When the support base 34 is rotated between material layers 82, the lay-up has different orientations, such as the composite material shown in FIG. 6.

Figure 6:
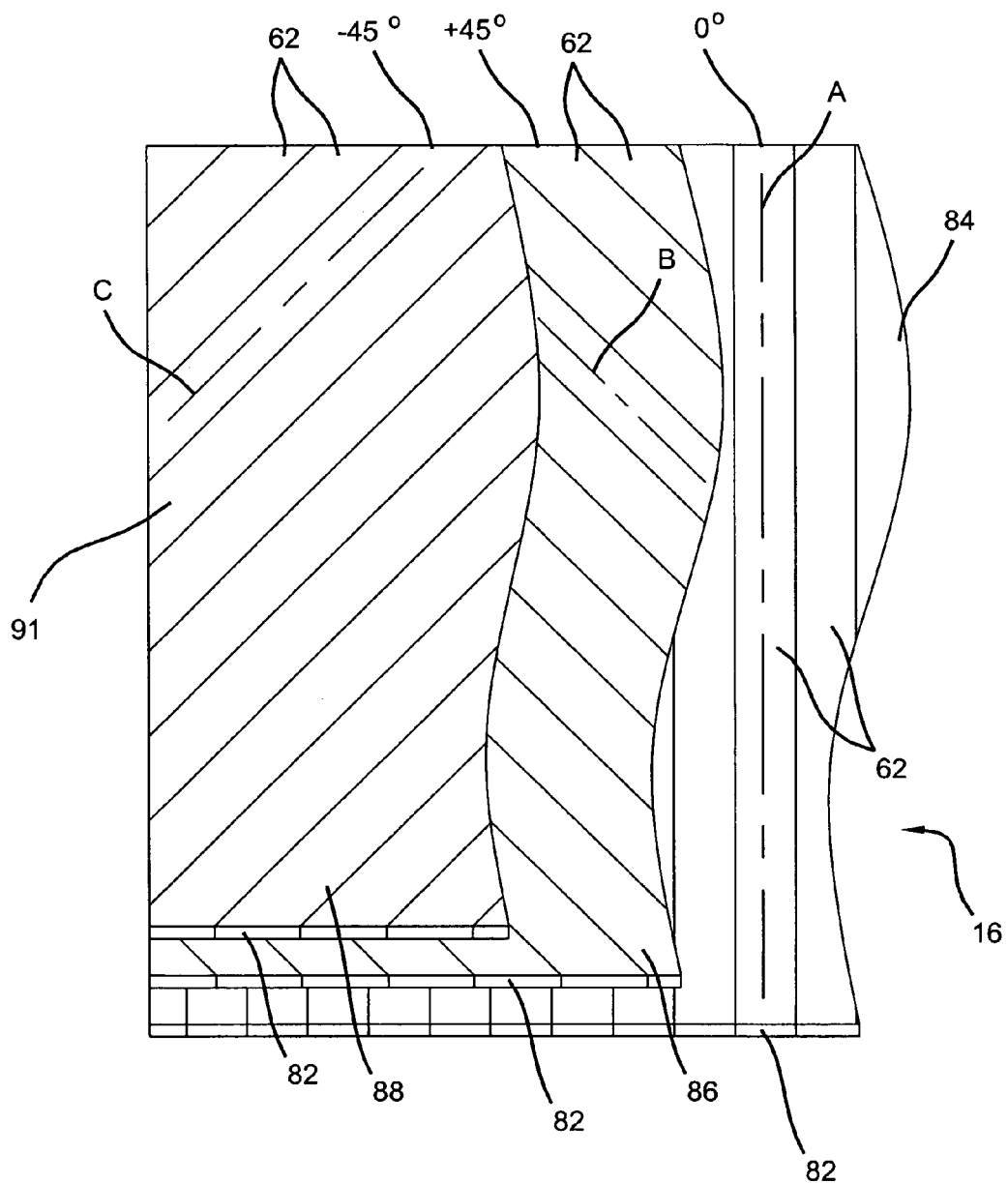
FIG. 6 is a partially broken away plan view of the composite lay-up of FIG. 1 illustrating the various layers of strip material and their orientations.

In the particular example provided in FIG. 6, a first layer 84 comprising multiple material strips 62 applied to the work surface datum 16 each laid along an axis that is parallel to a first predetermined axis as formed by movement of the bridge rail 22 along the X axis. A second layer 86 of strip material 62 is applied over the first layer 84 such that each of the strips 62 are applied along an axis that is parallel to a second predetermined axis B, which is rotated at +45° from axis A. To accommodate this change, the support base 34 is rotated counter-clockwise 45° from the 0° position. A third layer 88 of strip material 62 is applied over the second layer 86, such that each of the strips are applied along an axis that is parallel to a third predetermined axis C, which is rotated −45° from axis A. To accommodate this change, the support base 34 is rotated clockwise 45° from the 0° position (i.e., 90° clockwise from the +45° position). The location of the 0° position relative to the work surface datum 16 is established by the specifications for the composite article. In one preferred embodiment of the present invention, the rotary turntable 80 is automated via the conventional rotary drive mechanism 80a, of the type that are well known in the art. The operation of the rotary turntable 80a is integrated with the application of strip material 62 from the material dispensers 36. Further, as recognized by one of skill in the art, various configurations and angles may be selected for a composite material lay-up 91. As such, the above example is not intended to limit the scope of the invention.

Multiple layers of the strip material applied over the work surface datum 16 (i.e. the composite material lay-up 91) can have layers 82 of strip material 62 ranging from four to over one-hundred. In one preferred embodiment of the present invention, the strip material 62 has a width of 6 inches and creates a swath of material strips 62 having an overall width of approximately 15 feet (where there are 15 material dispensers on each side of the gantry 18 or 30 total including both sides). A preferred range for the number of layers 82 for the lay-up 91 is between about 20 and 40 layers.

Figure 7:
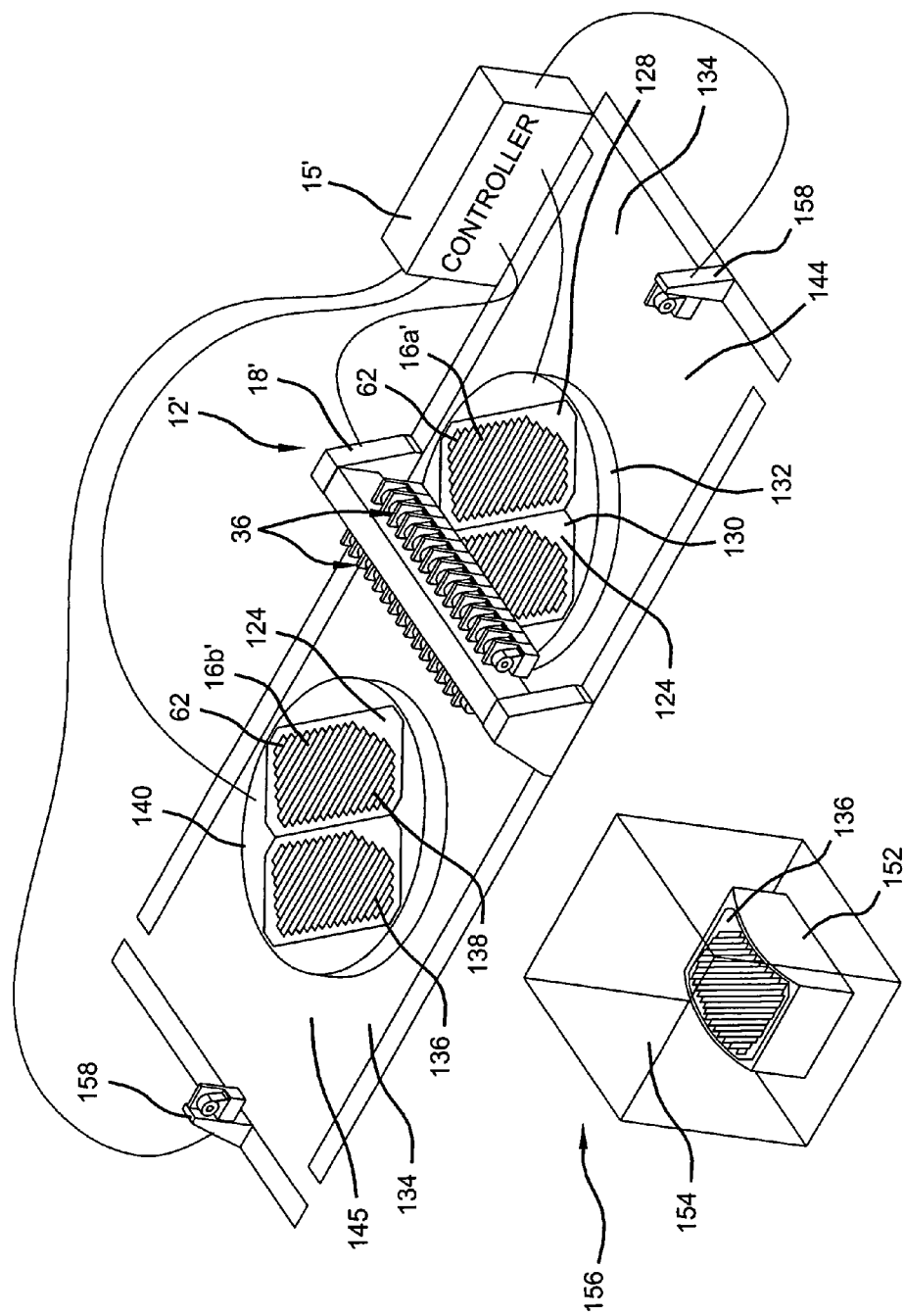
FIG. 7 is a perspective view of a first alternate preferred embodiment of the present invention showing dual support bases in an active and a non-active area and a processing station.

In FIG. 7, an alternately constructed composite fabrication device 12' is illustrated, wherein the material dispensers 36 apply strip material 62 to at least two structures 124 having work surface datums 16a' and 16b'. The several components of the composite fabrication device 12' are controlled similarly to those described in previous embodiments by a controller 15'. A first and second structure 128 and 130, respectively, rest on a first support base 132 within the work area 134, in an active area 144. A non-active area 145 within the work area 134 is identically configured to the active area 144 above, and has a third and fourth structure 136 and 138, respectively, resting on a second support base 140. An overhead gantry 18' configuration is the same structurally and operably as those described in previous embodiments, and has a plurality of material dispensers 36 that apply strip material 62 to the work surface datums 16a', 16b'. The gantry 18' applies strip material 62 to the first and second structures 128,130 on the first support base 132 in active area 144. The second support base 140 with the third and fourth structures 136,138 are in the non-active area 145, where the gantry 18' is not operating overhead. This embodiment permits two separate working areas 144,145 for the gantry 18' and material dispensers 36. Thus, while the gantry 18' is working over the first support base 132, the second support base 140 may be accessed for other activities aside from strip material application. This configuration is particularly advantageous where the structure 124 has lay-up applied (e.g. the transfer sheet or lay-up mandrel itself) and must be transferred to another station for further processing.

As shown in FIG. 7, the structures 124 are two separate transfer sheets, a third and fourth transfer sheet, 136 and 138, that are placed on the second support base 140. The third and fourth transfer sheets 136,138 are transferred and placed on a lay-up mandrel 152 (for simplicity only a single lay-up mandrel is depicted in FIG. 7). The lay-up mandrel 152 is then cured or cross-linked in a processing chamber 154. Such a processing chamber 154 is typically a heat oven or an autoclave chamber. The configuration of multiple support bases 132,140 in the present embodiment permits continuous material dispenser 36 application and increases work efficiency over a single support base (132 or 140), where operations must be ceased to remove and place a new structure 124 onto the support base (132 or 140).

Figure 8:
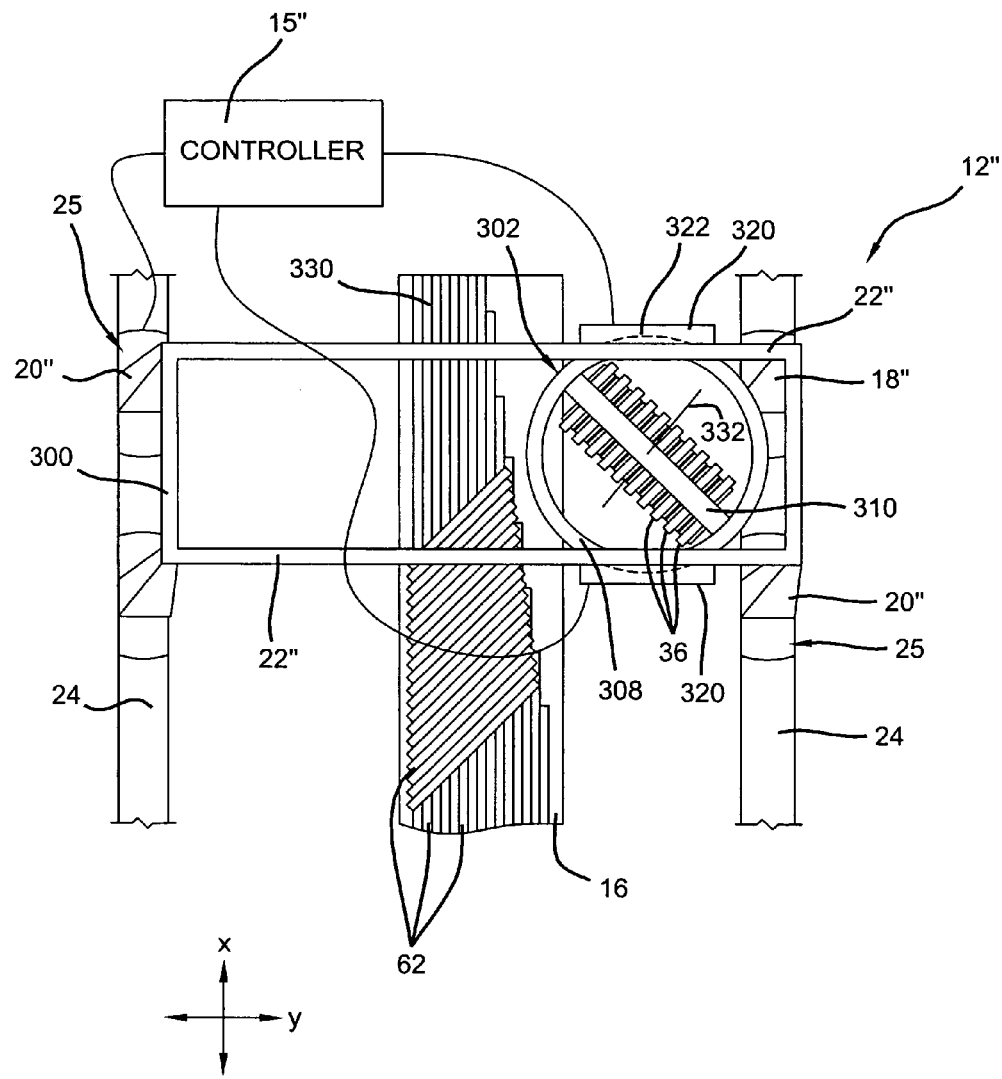
FIG. 8 is a partial overhead view of a second alternate preferred embodiment of the gantry and material dispenser configuration in accordance with the present invention.

FIG. 8 is a partial overhead view of a composite fabrication device 12" constructed in accordance with the teachings of a second alternate embodiment of the present invention. The composite fabrication device 12" includes a gantry 18" having four vertical beams 20", a pair of spaced apart bridge rails 22", a pair of lateral stabilizers 300 and a rotary dispensing unit 302 that is suspended from the bridge rails 22". Each bridge rail 22" is coupled to a pair of the vertical beams 20" and each lateral stabilizer 300 is coupled to a pair of vertical beams 20". The gantry 18" is movable on the tracks 24 in a manner that is similar to that described above for the embodiment of FIG. 1.

The rotary dispensing unit 302 includes an arcuate outer track 308 and a rail 310 to which the material dispensers 36 are mounted. The rail 310 may be similar to the track 65 (FIGS. 1 and 2), and the material dispensers 36 are removably and adjustably coupled to the rail 310 through conventional quick connects 68 in a manner similar to that which is described above. The bridge rails 22" support the outer track 308 for rotation thereon, with the rotation of the outer track 308 being controlled via a conventional and well known rotary drive mechanism 320. The rail 310 is fixed to the outer track 308. Alternately, the outer track 308 may be non-rotatably supported by the bridge rails 22" and the rail 310 rotatably coupled to the outer track 308.

A linear drive mechanism 322 is further provided to control the movement of the rotary dispensing unit 302 along the Y axis on the bridge rails 22". The linear drive mechanism 322, rotary drive mechanism 320, and drive mechanism 25 are preferably coordinated by a controller 15" so that the axis 332 of the rotary dispensing unit 302 may be accurately positioned rotationally and thereafter moved in the X and Y directions to dispense strip material 62 into the work surface datum 16 along a desired axis.

In the particular embodiment illustrated, a first layer 330 was applied with the rotary dispensing unit 302 in a 0° orientation. Then, the rotary dispensing unit 302 was rotated clockwise to a −45° angle with respect to the 0° axis reference, and the gantry 18″ traveled along the X and Y directions to apply a second layer. As appreciated by one of skill in the art, the gantry 18″ may travel only partially along the tracks 24 to apply strip material 62 at an angle, rather than full strokes from one end to the other. Preferably, due to the highly synchronized movements required in the present invention, the present embodiment is fully automated with computerized control systems. Other aspects of the present invention are similar to those previously described, such as automatic material replacement.

The present invention further provides methods for forming composite containing materials according to the teachings of the preferred embodiments of the present invention. A method for fabricating a composite article includes the steps of providing a plurality of material dispensers 36, where each of the material dispensers 36 dispenses a strip material 62 to a work surface datum 16 on a structure 14 beneath the material dispensers 36. Then the strip material 62 is applied to a work surface datum 16, wherein each of the material dispensers 36 applies strip material 62 along a predetermined axis onto the work surface datum 16 to form a first layer 84 having a first orientation, wherein the work surface datum 16 is movable relative to the plurality of material dispensers 36, or in the alternative, wherein the plurality of material dispensers 36 are movable relative to the work surface datum 16. Next, either the work surface datum 16 or the plurality of material dispensers 36 are rotated, and then strip material 62 is applied over the first layer 84 along a predetermined axis to form a second layer 86 having a second orientation. Such a process may be repeated to apply multiple layers 82. The strip material 62 can be cut by a cutting device 102 prior to the rotation step. A treatment step may follow the application of the layers 82 of strip material 62 to the work surface datum 16, where the layers 82 are cured or reacted. Further, the plurality of material dispensers 36 can be automatically changed with material dispenser changers 40.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. A device for fabricating a composite article comprising:
a structure defining a work surface datum;
a plurality of material dispensers movable relative to said structure, wherein each of said material dispensers applies a strip material to said work surface datum along a predetermined axis; and
wherein each of said predetermined axes are parallel to one another and wherein said strip material when applied to the work surface datum forms an integral flat layer of a single composite article;
wherein said plurality of material dispensers includes at least a first material dispenser and at least a second material dispenser separate from the first material dispenser that applies strip material to the same work surface datum as the first material dispenser, wherein the second material dispenser only applies strip material to said work surface datum in a direction opposite that which the first material dispenser applies strip material to said work surface datum, wherein the first material dispenser applies strip material to said work surface datum in a first direction while the second material dispenser is inactive, and the second material dispenser applies strip material to said work surface datum in a second direction while the first material dispenser is inactive.

2. The device according to claim 1, further comprising a support base, wherein said structure rests on said support base.

3. The device according to claim 1, wherein at least two structures are placed under said plurality of material dispensers.

4. The device according to claim 1, wherein said structure is a lay-up mandrel.

5. The device according to claim 1, wherein said structure is a transfer sheet.

6. The device according to claim 1, further comprising a gantry, wherein said plurality of material dispensers are attached thereto.

7. The device according to claim 6, wherein said gantry includes a rotary mechanism for rotating said plurality of material dispensers.

8. The device according to claim 1, further comprising a gantry, wherein said plurality of material dispensers are attached thereto, and wherein said first material dispenser is attached to a first side of said gantry, and said second material dispenser is attached to a second side of said gantry.

9. The device according to claim 8, wherein said plurality of material dispensers is attached to said gantry by a quick release connection.

10. The device according to claim 6, wherein one of said gantry and said structure is rotatable relative to the other one of said gantry and said structure.

11. The device according to claim 2, wherein said support base includes a rotary turntable.

12. The device according to claim 1, wherein said strip material comprises a material selected from the group consisting of: fiber reinforced composites, polymers, adhesives, metals, and mixtures thereof.

13. The device according to claim 12, wherein said fiber reinforced composite material is selected from the group consisting of pre-impregnated resin composite material and non-impregnated composite material.

14. The device according to claim 12, wherein said fiber reinforced material comprises fibers selected from the group consisting of: carbon containing fibers, Kevlar® fibers, glass, and mixtures thereof.

15. The device according to claim 1, wherein said strip material comprises a fiber reinforced composite material selected from the group consisting of: tape, woven cloth, non-woven cloth, paper, and mixtures thereof.

16. The device according to claim 1, further comprising an automated strip material replacement system for replacing strip material for said plurality of material dispensers.

17. The device according to claim 16, wherein said strip material replacement system includes a mobile modular strip material changer.

18. The device according to claim 1, wherein said each of said plurality of material dispensers includes a retractable compactor operable for smoothing said strip material along said work surface datum.

19. The device according to claim 18, wherein said retractable compactor has a rotational degree of freedom with respect to a contoured surface on said work surface datum, wherein said retractable compactor smoothes strip material over said contoured surface along said work surface datum.

20. A device for fabricating a composite article comprising:
a plurality of material dispensers operable for applying strip material to a plurality of structures within a work area, wherein said plurality of material dispensers are movable relative to said plurality of structures;
wherein at least one of said structures is in an active region of said work area and said plurality of material dispensers applies strip material thereto to form an integral flat layer of a single composite article, and at least one of said structures is in an inactive region of said work area in which said plurality of material dispensers are not applying strip material thereto;
wherein said plurality of material dispensers includes at least a first material dispenser and at least a second material dispenser separate from the first material dispenser that applies strip material to the same work surface datum as the first material dispenser, wherein the second material dispenser only applies strip material to said work surface datum in a direction opposite that which the first material dispenser applies strip material to said work surface datum, wherein the first material dispenser applies strip material to said work surface datum in a first direction while the second material dispenser is inactive, and the second material dispenser applies strip material to said work surface datum in a second direction while the first material dispenser is inactive.

21. The device according to claim 20, wherein said structure is a lay-up mandrel.

22. The device according to claim 20, wherein said structure is a transfer sheet.

23. The device according to claim 20, wherein said plurality of material dispensers are attached to a gantry.

24. The device according to claim 23, wherein said gantry is rotatable relative to said plurality of structures.

25. The device according to claim 20, wherein said plurality of structures are on a plurality of support bases.

26. The device according to claim 25, wherein said plurality of support bases are movable relative to said plurality of said material dispensers.

27. The device according to claim 25, wherein said plurality of support bases comprise a rotary turntable.

28. The device according to claim 20, wherein said strip material in said plurality of material dispensers is replaced by an automated replacement system.

29. The device according to claim 28, wherein said automated replacement system includes a mobile modular strip material changer.

30. The device according to claim 20, wherein said strip material comprises a material selected from the group consisting of: a fiber reinforced composite, a polymer, an adhesive, a metal, and mixtures thereof.

31. The device according to claim 20, wherein said strip material comprises a fiber reinforced composite material selected from the group consisting of: tape, woven cloth, non-woven cloth, paper, and mixtures thereof.

32. The device according to claim 31, wherein said fiber reinforced composite material is selected from the group consisting of pre-impregnated resin composite material and non-pre-impregnated resin composite material.

33. The device according to claim 31, wherein said fiber reinforced material comprises fibers selected from the group consisting of: carbon containing fibers, Kevlar® fibers, glass, and mixtures thereof.

34. The device according to claim 1, wherein each said material dispenser includes an onboard supply of strip material.

35. The device according to claim 34, wherein each said material dispenser includes a housing, a spool within the housing, and strip material rolled onto the spool.

36. The device according to claim 34, wherein each said material dispenser includes a housing, a cartridge within the housing, and strip material within the cartridge.

37. The device according to claim 36, further comprising at least one automated material changer operable for changing out the cartridges carried onboard the material dispensers.

38. The device according to claim 34, further comprising at least one automated material changer operable for changing out the material dispensers.

39. The device according to claim 34, wherein each said onboard supply of strip material is the only source of strip material for the corresponding material dispenser.

40. The device according to claim 34, wherein said material dispensers are operable for simultaneously applying parallel strips of material to said work surface datum to thereby form a layer of the composite article.

41. The device according to claim 34, wherein said plurality of material dispensers are attached to a movable gantry for common translation therewith, wherein said plurality of material dispensers includes a first material dispenser that applies strip material to said work surface datum in a first direction during an out stroke of said gantry, and a second material dispenser that applies strip material to said work surface datum in a second direction during a return stroke of said gantry, and wherein said first direction and said second direction are opposite to one another.

42. The device according to claim 34, wherein the onboard supply of strip material includes strip material having a width of about six inches or more.

43. The device according to claim 1, wherein said material dispensers are operable for collectively applying parallel strips of material to said work surface datum to thereby form a generally flat layer of a generally flat composite article.

44. The device according to claim 1, wherein the first material dispenser applies a first layer of strip material in the first direction and the separate second material dispenser applies a second layer of strip material in the second direction over the first layer of strip material, in a single roundtrip stroke of travel in the first direction followed by travel in the second direction.

45. The device according to claim 20, wherein the first material dispenser applies a first layer of strip material in the first direction and the separate second material dispenser applies a second layer of strip material in the second direction over the first layer of strip material, in a single roundtrip stroke of travel in the first direction followed by travel in the second direction.

* * * * *